(12) United States Patent
Udengaard (10) Patent No.: US 10,379,239 B2
(45) Date of Patent: Aug. 13, 2019

(54) METHOD AND COMPUTER SYSTEM FOR DETERMINING SEISMIC NODE POSITION

(71) Applicant: Fairfield Industries Incorporated, Sugar Land, TX (US)

(72) Inventor: Carsten Udengaard, Sugar Land, TX (US)

(73) Assignee: Fairfield Industries Incorporated, Sugar Land, TX (US)

(\*) Notice: Subject to any disclaimer, the term of this patent is extended or adjusted under 35 U.S.C. 154(b) by 548 days.

(21) Appl. No.: 14/553,172

(22) Filed: Nov. 25, 2014

(65) Prior Publication Data

US 2016/0146958 A1   May 26, 2016

(51) Int. Cl.
*G01V 1/28* (2006.01)
*G01V 1/38* (2006.01)

(52) U.S. Cl.
CPC ............ *G01V 1/28* (2013.01); *G01V 1/38* (2013.01); *G01V 1/3835* (2013.01); *G01V 2210/1427* (2013.01)

(58) Field of Classification Search
CPC .......... G01V 1/28; G01V 1/38; G01V 1/3835; G01V 2210/1427
USPC ........................................................ 702/14
See application file for complete search history.

(56) References Cited

U.S. PATENT DOCUMENTS

| | | | |
|---|---|---|---|
| 5,691,957 A | 11/1997 | Spiesberger | |
| 6,131,694 A | 10/2000 | Robbins | |
| 6,188,963 B1 | 2/2001 | Paffenholz | |
| 2004/0073370 A1\* | 4/2004 | Dasgupta | G01V 1/42 702/6 |
| 2009/0296519 A1 | 12/2009 | Keers et al. | |
| 2011/0122725 A1 | 5/2011 | Hopperstad | |

(Continued)

FOREIGN PATENT DOCUMENTS

WO   2013184724   12/2013

OTHER PUBLICATIONS

Hays, David, et al., "An Ocean Bottom Seismic Node Repeatability Study", SEG Las Vegas 2008 Annual Meeting, SEG Technical Program Expanded Abstracts, Nov. 9, 2008, pp. 55-59.

(Continued)

*Primary Examiner* — Huan Hoang
(74) *Attorney, Agent, or Firm* — Bond, Schoeneck & King, PLLC; Jeffrey Powers; William Greener (57) ABSTRACT

A computing system and method for determining the x, y energy receiver (node) positions regardless of the angle at which the energy was released from the source. The process and computing system involves an iterative looping technique that is executed in data processing software wherein an initial model position based on, in essence, a best guess as to a node's location, followed with the iterative process of statistically comparing model data to actual data and then adjusting the model position by some predetermined amount and comparing this new result to the actual data to determine if the newly adjusted position is statistically better or worse than the originally selected position assumption. The process can be repeated using continuously smaller distance adjustments to the previously determined best position. Once satisfied that the true best position has been achieved, the processing can cease and the XY position data may be used in the normal course of generating seismic maps.

40 Claims, 7 Drawing Sheets

(56) References Cited

U.S. PATENT DOCUMENTS

2011/0273958 A1 11/2011 Xia
2012/0051178 A1 3/2012 Zhang
2015/0168576 A1* 6/2015 Craft .................. G01V 1/36
                                            702/14
2017/0017006 A1* 1/2017 Noss .................. G01V 1/3835

OTHER PUBLICATIONS

Docherty, Paul, et al., "Ambiguities in direct arrival time inversion for ocean bottom nodes", 74th EAGE Conference & Exhibition incorporating SPE EUROPEC 2012, Copenhagen, Denmark, Jun. 4-7, 2012, http://www.fairfieldnodal.com/assets/pdf/DochertyHaysEAGE2012.pdf, retrieved on Apr. 25, 2016, pp. 1-5.

* cited by examiner

METHOD AND COMPUTER SYSTEM FOR DETERMINING SEISMIC NODE POSITION

REFERENCE TO RELATED APPLICATION

N/A

BACKGROUND

The present invention relates generally to seismic data acquisition and analysis gained through conducting a seismic survey, and more particularly to methodologies for improving the accuracy of the results based upon the seismic data analysis.

The generation and recording of seismic data involves many different receiver configurations, including laying geophones or seismometers on the surface of the Earth or seafloor, towing hydrophones behind a marine seismic vessel, suspending hydrophones vertically in the sea or placing geophones in a wellbore (as in a vertical seismic profile) to record the seismic signal. A source, such as a vibrator unit, dynamite shot, or an air gun, generates acoustic or elastic vibrations that travel into the Earth, pass through strata with different seismic responses and filtering effects, and return to the surface to be recorded as seismic data. Optimal acquisition varies according to local conditions and involves employing the appropriate source (both type and intensity), optimal configuration of receivers, and orientation of receiver lines with respect to geological features. This ensures that the highest signal-to-noise ratio can be recorded, resolution is appropriate and extraneous effects such as air waves, ground roll, multiples and diffractions can be minimized or distinguished, and removed through processing.

Underwater seismic exploration is widely used to locate and/or analyze subterranean geological formations for the presence of hydrocarbon reservoirs. One type of survey uses a boat towing a plurality of air guns and an array of ocean bottom nodes (OBN) placed on the ocean floor. In deep water, the nodes are placed on the ocean floor by means of a remote operated vehicle (ROV) and subsea loader; typically the ROV and subsea loader are deployed from a deployment/retrieval boat separate from the tow or gun boat. Most shallow water surveys are done deploying the nodes via rope. In addition, some surveys use ocean bottle cable (OBC) with seismometers instead of nodes. This is a similar style to OBN where the seismometers are all on the seafloor, but they are connected to the "mothership" via a long cable. The two types of acquisition styles OBN and OBC are similar in many aspects and sometimes lumped together in a more general category of ocean bottom seismic (OBS).

To acquire the data, compressed air shots are released from the air guns at known periodic intervals and the location and timing of each shot is recorded. Likewise, the timing and intensity of each compressed air shot is recorded by the nodes. In deep water, the data is typically collected for at least 30 days to cover one full tidal cycle, but may be collected over a longer period depending on, for example, the size of the area being surveyed. In shallow water, most often the nodes are on the seafloor from 5-14 days; with 21 days being considered a long deployment for shallow nodes (which typically have a maximum battery life of 45 days.)

Four-dimensional seismic data collection generally comprises three-dimensional (3D) seismic data acquired at different times over the same area to assess changes in a producing hydrocarbon reservoir with time. Changes may be observed in fluid location and saturation, pressure and temperature. 4-D seismic data is one of several forms of time-lapse seismic data. Such data can be acquired on the surface or in a borehole. Time lapse seismic data involves seismic data collection from the surface or a borehole acquired at different times over the same area to assess changes in the subsurface with time, such as fluid movement or effects of secondary recovery. The data are examined for changes in attributes related to expressions of fluid content. Time-lapse seismic data can repeat 2D, 3D (which is known as 4-D seismic data), crosswell and VSP (vertical seismic profile) data.

While the direct arrival of energy at a node can be typically correctly picked when the angle of departure of the energy is less than 70 degrees, the direct arrival energy is unreliable to pick and use for positioning due to limited trace counts at the very short X, Y offsets. For example, in 100 m of water 70 degrees gives 274 m X, Y offset, at 25 m of water 70 degrees give 68 m of X, Y offset. Once you deployed to a depth of about 300 m and deeper, using the direct arrivals for positioning analysis is relatively straight forward. However, in shallow water (for example less than 300 m,) there are fewer shots to use for positioning analysis if using only direct arrivals. Furthermore, the refracted arrivals will often arrive before the direct arrival. It has been observed in most sea floor environments (but not all) that this happens at an offset around 3 times the depth of the node. Thus, while the quality of data is not affected, the reliability of using the direct arrival for positioning analysis when the angle of departure of the energy shot leaving the surface exceeds 70 degrees is adversely impacted.

In addition, the process used for deploying nodes, particularly in shallow water, gives very little control over the measurement of the water depth at each node location. Because there is local variability in local refractor velocities a method for positioning nodes must be stable in the presence of both depth of node errors and transit velocity error. Further complicating the data analysis, it is necessary to be able to detect when a node has been moved by external forces and determine correct positions of each location that a node occupied during a single deployment. In practice in shallow water surveys, the range of observed node movement has ranged from 5 m to 2000 m.

It is a primary object and advantage of the present invention to provide a method, system, and product that will improve data quality regardless of the angle at which the energy is shot from the surface.

Other objects and advantages of the present invention will in part be apparent to those of skill in the art, and in part appear hereinafter.

SUMMARY OF THE INVENTION

In accordance with the foregoing object and advantage, the present invention provides a system and method for determining the x, y energy receiver (node) positions and to do so regardless of the angle at which the energy was released from the source. In general terms, once a seismic survey has been conducted and the nodes retrieved from the ocean's floor and their data downloaded to a computing system, the present process and system will use the initial picked arrival times (most typically in shallow water this will be of the first refractor as transit velocities of the refracted arrivals tend to be faster than typical water column velocities.) The process and system involves an iterative looping technique that is executed in data processing software wherein an initial model position in used based on, in essence, a best guess as to a node's location based upon where it was intended to be placed, followed with the iterative process of statistically comparing model data to actual data and then adjusting the model position by some predetermined amount and comparing this new result to the actual data to determine if the newly adjusted position is statistically better or worse than the originally selected position assumption. The process can be repeated using continuously smaller distance adjustments to the previously determined best position. Once satisfied that the true best position has been achieved, the processing can cease and the X, Y position data may be used in the normal course of generating seismic maps. The data processing is typically performed using the hydrophone channel, but can be performed using the vertical geophone with no modification to the sequence. In addition, accurate knowledge of the transit velocity or node depth is not necessary for this process to work.

In one aspect of the invention, a computer implemented method for updating and refining the X, Y positions of an ocean bottom node for use in creating a seismic survey through the use of data that has been sensed and collected by the node after emission from an energy shot source and in regard to energy intensity and energy arrival time at the node, is provided that generally comprises the steps of conditioning the data retrieved from the node; performing a position estimation routine on the conditioned data; performing a position estimation sub-routine on the conditioned data to determine a refined position of the node; performing a post-position processing of the data; and outputting the data.

In another aspect of the invention, a non-transitory computer readable medium is provided that generally comprises instructions that when executed cause a computer capable of processing data to perform the steps of conditioning the data retrieved from the node; performing a position estimation routine on the conditioned data; performing a position estimation sub-routine on the conditioned data to determine a refined position of the node; performing a post-position processing of the data; and outputting the data.

In another aspect of the invention, a computer system is provided that generally comprises a data processor running data processing software on a computer and configured to receive data downloaded from a seismic node, wherein the data processing software is capable of determining the X, Y position of the node, the computer system further configured to perform the steps of conditioning the data retrieved from the node; performing a position estimation routine on the conditioned data; performing a position estimation sub-routine on the conditioned data to determine a refined position of the node; performing a post-position processing of the data; and outputting the data.

More specifically, the process, computer readable medium, and computer system each operate pursuant to the following steps:

1. The processing begins with a large offset range of input traces. Each trace represents a pairing between a shot that has occurred between the energy source and the energy receiver (node) with the offset representing the distance between a source and node pairing. The range input should be larger than any expected movement of nodes that may have occurred (i.e., if it expected that nodes may have moved 300 m due to external events/forces, then the input traces selected for initial processing should encompass distances between the source and node in excess of 300 m, but this selected range is a user parameter that can be selected based upon experience with the environment being surveyed). While the range of input traces can be thought of as a disc (with a radius centered on the source and extending to nodes within the prescribed range), it is also possible and in some environments preferable to sue what can be thought of as a "ring" of inputs (e.g., 50 m-300 m) that rejects the very short offset traces. The actual range selected and whether that range be of a "disc" type range of a "ring" type range wherein short offset traces are eliminated is a matter of user preference and experience.

2. Pick the largest peak and largest trough amplitudes in the first 2 seconds of data after the time of the energy shot (the time selected is also user preference based on experience, but for present purposes 2 seconds, which has been found to be a useful time period, is used for illustrative purposes only). The closer the source and node are to one another, the higher the difference between the peak and trough amplitudes. Conversely, the farther apart the source and node are from one another, the smaller the difference between the peak and trough amplitudes.

3. Determine the difference between the two measurements to give a total excursion value. As described in (2) above, this value is a reasonable indicator of the offset of a given trace due to the typical spherical divergence of amplitude (e.g., the energy at any point within the spherical divergence will decrease as the spherical surface increases pursuant to conservation of energy principles). The input data traces will be limited based on this amplitude to approximately 2000 m of offset with all traces above that distance being filtered out from the processing.

4. Pick the first arrival time on each trace using a standard first break picking routine (e.g., first data to be recorded by node after shot is fired). The wavelet that is being picked can be raw (unchanged from the field recording) or processed with filters to move to minimum phase or zero phase.

5. Determine an initial model position of the node. This can done using any one of several algorithms, including, but not limited to, using the node's pre-plot location, the average of the shot XY coordinates, or the shot location of the largest amplitude excursion determined above.

6. Using a predetermined transit velocity (e.g., 1500 m/sec) determine the model arrival times of traces in a node using the initial model node position and the known shot locations and node depth (for present purposes and in shallow water it is accurate to use a fathometer to obtain node depth; this instrument is less accurate in deeper water).

7. Compute the travel time error between the picked arrival times and the model arrival times (i.e., the error equals the difference between the picked arrival time and the calculated model arrival time).

8. Compute the standard deviation of the travel time error of all traces within a predetermined distance (e.g., 300 m) of the node's initial model position.

9. Recompute the standard deviation of travel time error computed in step 8, where all errors greater than a preselected number (e.g., 2) of standard deviations in magnitude are ignored as well. This location and standard deviation will be set as the best position and standard deviation.

10. Begin first iteration of node position update

11. A "grid" of position updates in X and Y will be looped over to determine an updated position. The first iteration is typically a large step size (i.e. 200 m on a 41×41 grid, so each step in the grid is 200 m from the model position); in other words, each iteration involves moving the node 200 m over the course of a 41×41 grid (with the node starting at the grid's center such that it takes 20 steps in each direction to encompass the 41×41 grid in the example provided). It should be noted that a Cartesian coordinate system type "grid" is disclosed, but other geometries of "grids" could also be used, such as, for example, circular with radius based steps. In addition, other "grid" sizes can be used, although in a Cartesian system, it is preferable to use an odd number for the grid so that movement of the node is equal in number in each direction.

12. With the model position compute the travel time error between the picked arrival times and the model arrival times.

13. Compute the standard deviation of the travel time error of all traces within a predetermined distance (e.g., 300 m) of the model position.

14. Recompute the standard deviation of travel time error computed in step 13, where all errors greater than a predetermined number (e.g., 2) of standard deviations in magnitude are ignored as well.

15. Compare the standard deviation computed in step 14 with the previous best standard deviation. If the new standard deviation is lower then it becomes the new best standard deviation and the current position becomes the new best position. If the standard deviation from step 14 is greater than the previous best then there are no changes to the best position and standard deviation.

16. Repeat steps 12-15 for all grid locations to test.

17. The position and standard deviation from the first loop are then used as the initial solution for a finer X and Y position scan.

18. Repeat steps 12-15 with a smaller grid size (e.g., step size of 5 m on a 41×41 grid).

19. The position and standard deviation from the second loop are then used as the initial solution for a finer X and Y position scan.

20. Repeat steps 12-15 with a smaller grid size (i.e. step size of 0.1 m on a 41×41 grid).

21. Sort all traces for a given node into chronological order and scan for larger changes in the yaw measurement (compass heading).

22. If there are occurrences of large yaw changes and the final computed best standard deviation is large (for example, when a node moves part of the way through the data collection), then split the node into time periods separated by large changes in yaw (such that each time period will be include only the time when a single position was occupied by that node). If the standard deviation of travel time error is small then the node is not split into multiple ensembles. It is worth noting that movement of a node is easiest to detect by looking at changes in yaw (this is a compass heading), but when nodes are moved their tilt (pitch and roll) are sometimes changed as well; however, the yaw is just the easiest one to see change, although any or all of the orientations can be used for this purpose.

23. Repeat steps 6-21 for all nodes. If a node was split into multiple pieces in step 22 then each piece is passed through the sequence separately.

24. Output to an ASCII file (or other usable file format) each node name and updated position for each piece (if necessary).

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
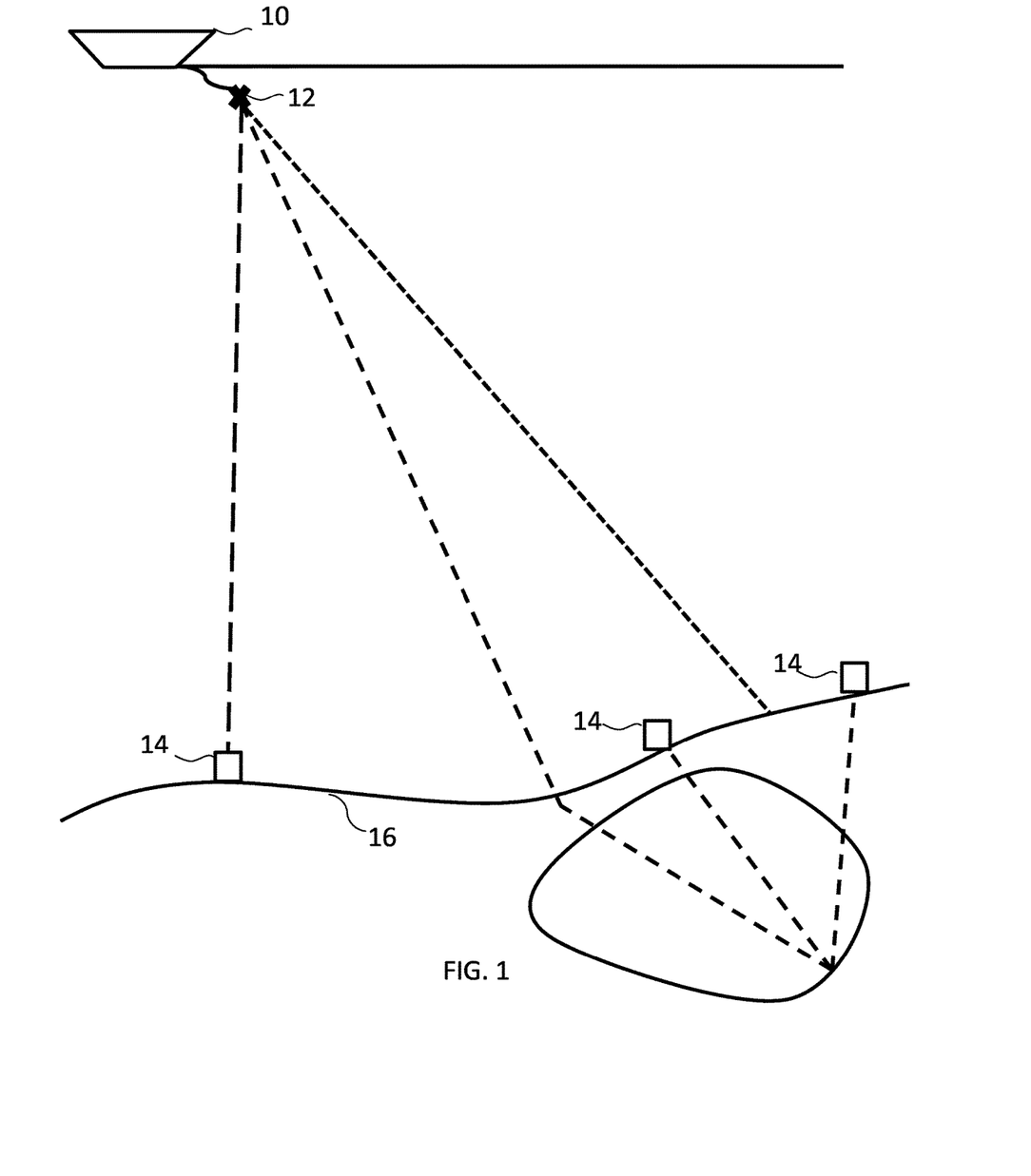
FIG. 1 is an illustrative schematic representation of a boat performing a seismic survey.

Referring to the drawings, wherein like reference numerals refer to like parts throughout, there is seen in FIG. 1 a boat 10 that is pulling an array of compressed air guns 12. Boat 10 is driven to traverse a grid of seismic nodes 14 that have been placed upon the ocean's floor 16 in a predetermined pattern. As boat 10 traverses atop the grid of nodes 14, shots of compressed air are emitted from gun 12 at predetermined intervals. The compressed air radiates downwardly through the water where the energy in the compressed air is ether directly received by each of the nodes 14 or refracts through the ocean floor 16 before reflecting back and reaching the nodes 14. It is the intention that for each shot of compressed air emitted by gun 12, the timing of the receipt of the shot and a corresponding energy level will be sensed and recorded in each of the nodes 14 regardless of whether the energy was directly received by each node 14 or received only after having been reflected/refracted by the ocean's floor 16.

The placement of the nodes 14 on the ocean's floor 16 is an inexact science wherein the positions of the nodes may vary due to many external factors, including, for example, current, fishing nets that engage a node or nodes and drag them for some distance before releasing, sea creatures that may bump a node, sliding of a node off an uneven surface formed on the ocean's floor, among other factors. However, in order for the seismic data to be accurately analyzed, it is important to know to the highest degree possible the position from which each shot was sent and the position of each node, as well as the water column velocity. While the position from which each shot is sent is accurately determined by GPS or other position sensing equipment, and the depth of the nodes (e.g., the Z position) can be determined through use of a fathometer or other depth gauge used when picking up the nodes, the precise X, Y position of the nodes is precisely unknown due to the nodes being located on the ocean's floor.

Figure 2:
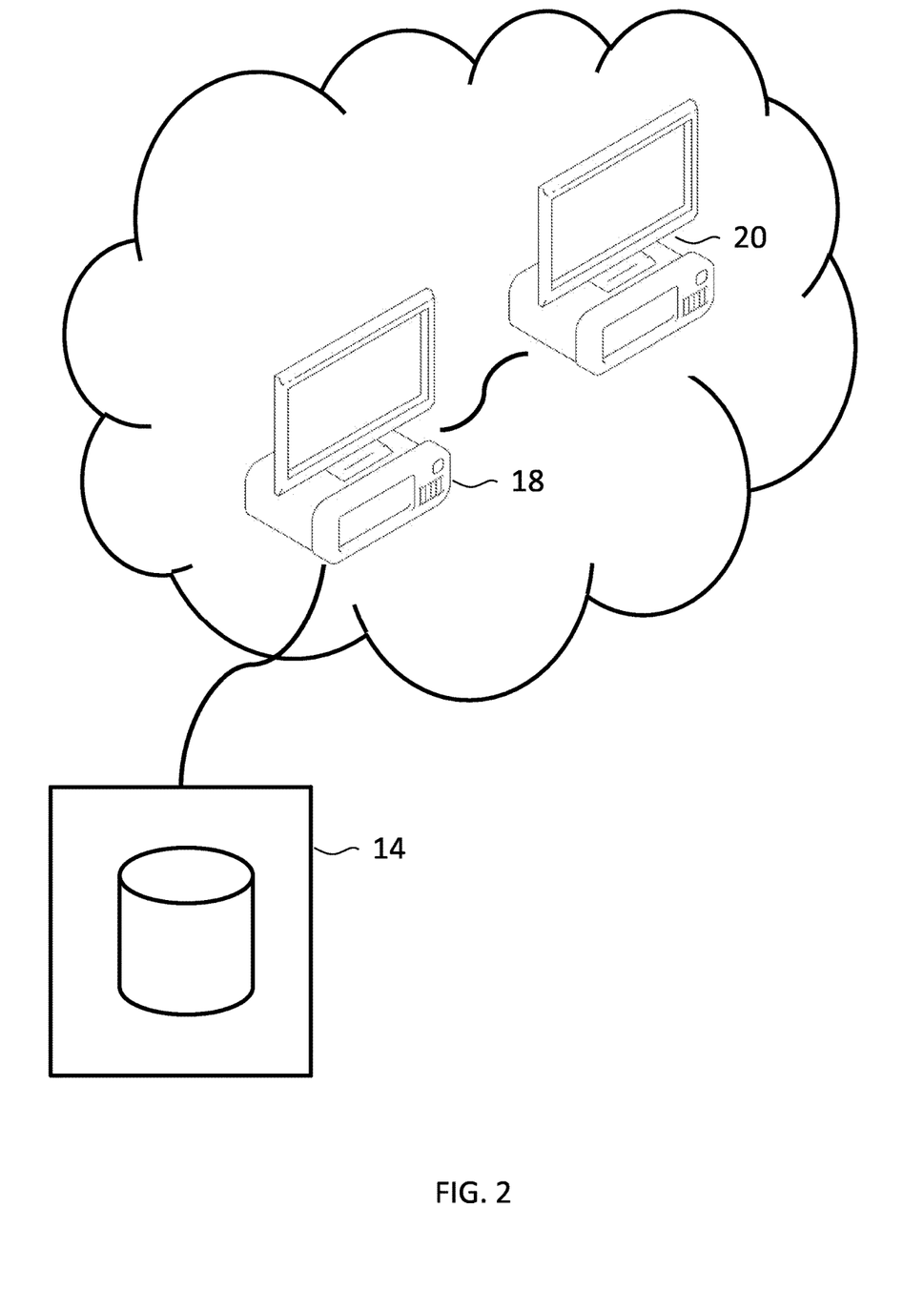
FIG. 2 is an illustrative schematic representation of a seismic node downloading data to a computer which then uploads the data to a data processing computer.

An aspect of the present invention provides the means by which the X, Y position of each node can be accurately determined. As illustrated in FIG. 2, the methodology associated with the X, Y node position determining means is programmed into a computer having a processor capable of data processing. Once the nodes 14 are retrieved from the ocean's floor 16, the data they have stored (including, for example, the time at which each shot was received and the corresponding intensity of energy received) is downloaded into a computer 18. That data is then uploaded to a data processing computer 20 (which may or may not be the same as computer 18, and the transmission of data may be done via hard-wired connection or wirelessly) where data processing software programmed according to methodology of the present invention processes the data. Once fully processed, the complete data set from the seismic survey is utilized for purposes of generating a seismic map or other form of output from which a useful expression of the seismic survey can be observed and used.

Figure 3:
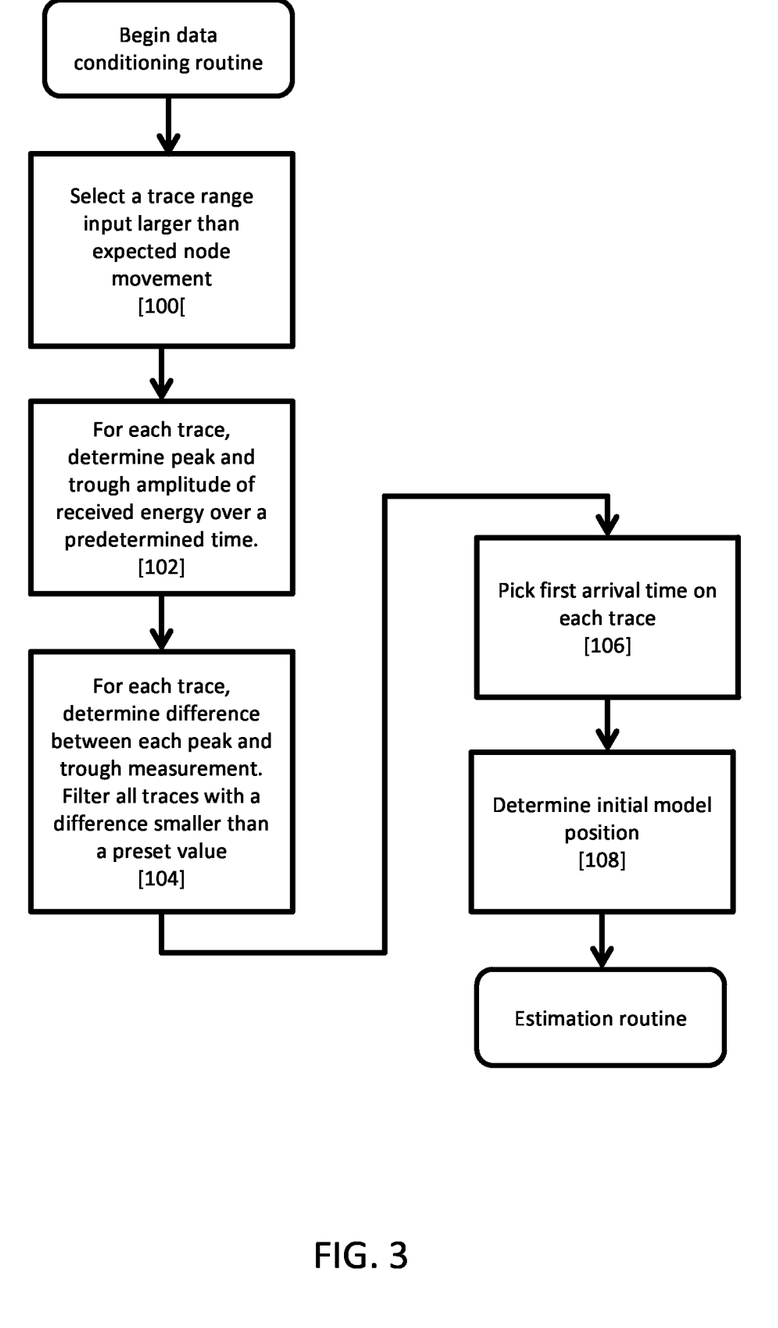
FIG. 3 is a flow chart of the initial data conditioning methodology in accordance with an aspect of the invention.

To that end and referring to FIGS. 3-6, a preferred mode for executing the methodology (and a computer programmed to perform the methodology) proceeds as follows:

1. In step 100, a large offset range of input traces is selected. Each trace represents a pairing between a shot that has occurred between the energy source and the energy receiver (node 14) and the offset represents the distance between a source and node pairing. The range input should be larger than any expected movement of nodes that may have occurred (i.e., if it expected that nodes may have moved 300 m due to external events/forces, then the input traces selected for initial processing should encompass distances between the source and node in excess of 300 m, but this selected range is a user parameter that can be selected based upon experience with the environment being surveyed). While the range of input traces can be thought of as a disc (with a radius centered on the source and extending to nodes within the prescribed range), it is also possible and in some environments preferable to use what can be thought of as a "ring" of inputs (e.g., 50 m-300 m) that rejects the very short offset traces. The actual range selected and whether that range be of a "disc" type range of a "ring" type range wherein short offset traces are eliminated is a matter of user preference and experience.

2. Next, in step 102, the largest peak and largest trough amplitudes (energy levels) in a first predetermined number of time (e.g., 2 seconds has been shown in practice to work well) of data after the time of the energy shot are picked. The closer the source and node are to one another, the higher the difference between the peak and trough amplitudes. Conversely, the farther apart the source and node are from one another, the smaller the difference between the peak and trough amplitudes.

3. Next, in step 104, the difference between the two measurements is determined to give a total excursion value. As described in step 102, this value is a reasonable indicator of the offset of a given trace due to the typical spherical divergence of amplitude (e.g., the energy at any point within the spherical divergence will decrease as the spherical surface area increases pursuant to conservation of energy principles). The input data traces will be limited based on this amplitude to approximately 2000 m of offset with all traces above that distance being filtered out from the processing.

4. Next, in step 106, the first arrival time on each trace is picked using a standard first break picking routine (e.g., first real energy data to be recorded by node after shot is fired). The wavelet that is being picked can be raw (unchanged from the field recording) or processed with filters to move to minimum phase or zero phase.

5. Next, in step 108, an initial model position of the node is determined. This can done using any one of several known algorithms, including, but not limited to, using the node's pre-plot location, the average of the shot X, Y coordinates, or the shot location of the largest amplitude excursion determined above.

Figure 4:
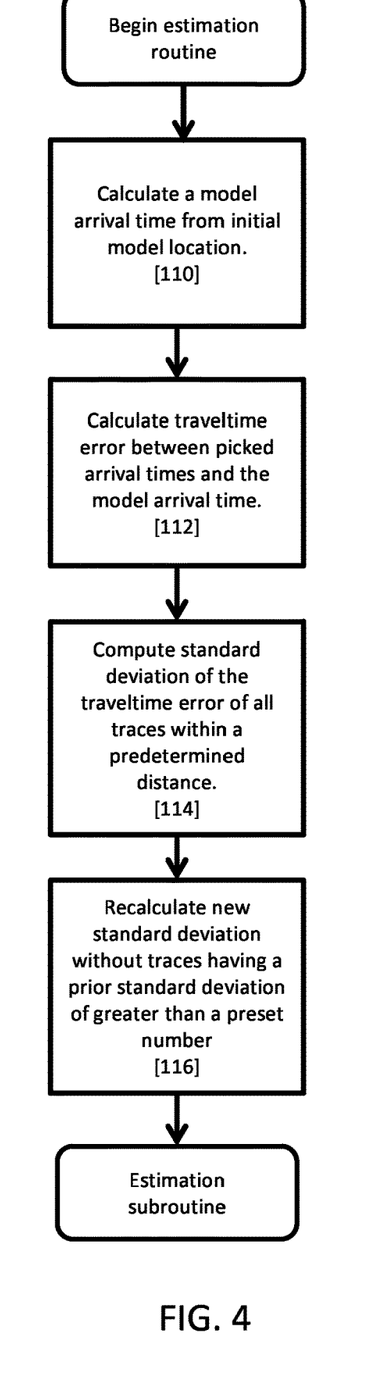
FIG. 4 is a flow chart of the node position estimation routine in accordance with an aspect of the invention.

6. Next, in step 110, using a predetermined transit velocity (e.g., air traveling at 1500 msec through water), the model arrival times of traces in a node using the initial model node position and the known shot locations and node depth (for present purposes and in shallow water it is accurate to use a fathometer to obtain node depth; this instrument is less accurate in deeper water) is determined/calculated.

7. Next, in step 112, the travel time error between the picked arrival times and the model arrival times (i.e., the error equals the difference between the picked arrival time and the calculated model arrival time) is calculated.

8. Next, in step 114, the standard deviation of the travel time error of all traces within a predetermined distance (e.g., 300 m) of the node's initial model position is computed. It should be noted that the term standard deviation is being used in the sense of it being a mathematical function that provides for minimizing the variance or dispersion from the mean. The minimization of the "quality" term (in the present example of the invention, the "quality" term is being referred to as "standard deviation") and it should be a minimization of the variance of the traveltime error. Other examples of mathematical functions that could serve this purpose include the average absolute deviation about the mean or the mean absolute deviation about the mean. The importance is in using the math to try to minimize the variance of the error from the mean. Thus, the terms "standard deviation" is intended to cover the traditional standard deviation formulation as well as any other mathematical formulation useful at providing indication of a minimization of the variance of the traveltime error.

9. Next, in step 116, the standard deviation of travel time error computed in step 114 is re-computed, wherein all errors greater than a preselected number (e.g., 2) of standard deviations in magnitude are ignored. The location and standard deviation will be then be set as the best position and standard deviation.

10. The first iteration of node position update can then begin according to the estimation subroutine illustrated in FIG. 5.

Figure 5:
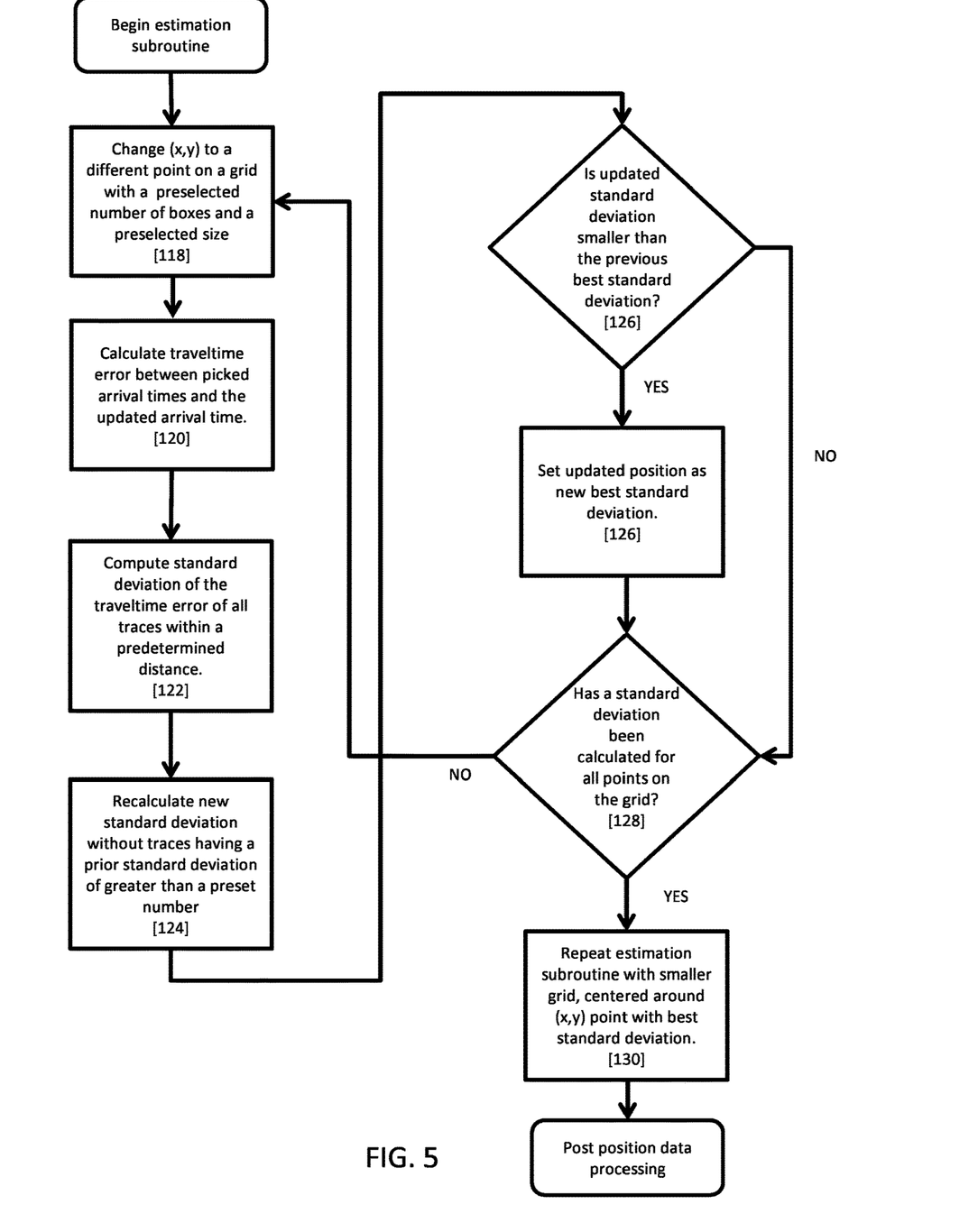
FIG. 5 is a flow chart of the node position sub-estimation routine in accordance with an aspect of the invention.
Figure 7A:
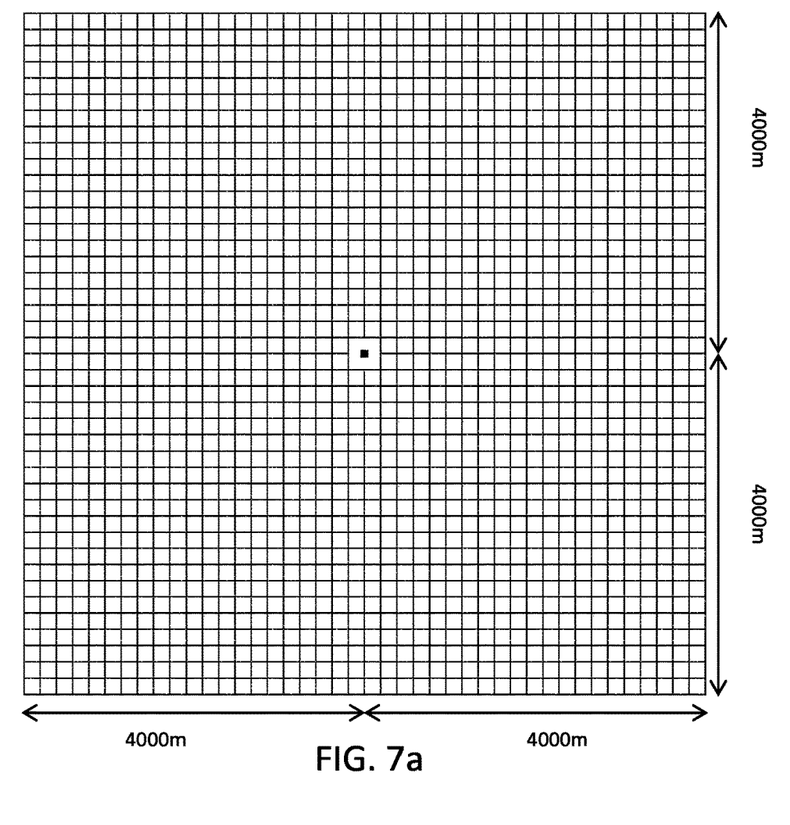
FIGS. 7(a)-(c) are symbolic representations of grids used in first, second, and third iterations, respectively, of the node position sub-estimation routine in accordance with an aspect of the invention.

11. In step 118, a grid of position updates in X and Y will be looped over to determine an updated position. As illustratively shown in FIG. —, the first iteration is typically a large step size so as to perform a coarse approximation of a refined position (i.e. 200 m on a 41×41 grid, so each step in the grid is 200 m from the model position; see FIG. 7(*a*)). It should be noted that a Cartesian coordinate system type grid is disclosed, but other geometries could also be used for this same purpose, such as, for example, circular with radius based steps. Furthermore, the grid can be of uniform geometry or of a variable geometry (e.g., different sized steps). It should further be noted that the grid size (e.g., the number of steps through which position permutations are performed) can vary, although it works best if an odd number of steps is used in a Cartesian type grid system so that the position can be adjusted an even number of steps in every direction.

12. Next, in step 120, using the model position compute the travel time error between the picked arrival times and the model arrival times.

13. Next, in step 122, the standard deviation of the travel time error of all traces within a predetermined distance (e.g., 300 m) of the model position is computed.

14. Next, in step 124, the standard deviation of travel time error computed in step 122 is re-computed, wherein all errors greater than a predetermined number (e.g., 2) of standard deviations in magnitude are ignored.

15. Next, in step 126, the standard deviation computed in step 124 with the previous best standard deviation is compared. If the new standard deviation is lower then it becomes the new best standard deviation and the current position becomes the new best position. If the standard deviation from step 124 is greater than the previous best then there are no changes to the best position and standard deviation.

16. Next, in step 128, the decision is made to ensure that steps 120-126 are repeated for all grid locations to test.

17. Returning to step 120, the position and standard deviation from this first loop are then used as the initial solution for a finer X and Y position scan.

Figure 7B:
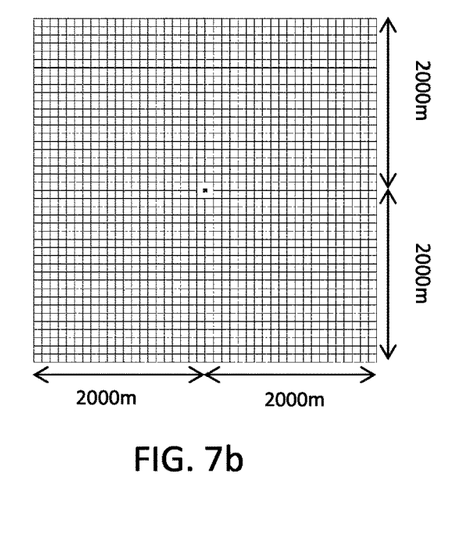

18. Thus, in step 130, steps 120-126 are repeated with a smaller step size (e.g., a step size of 5 m on a 41×41 grid as illustrated in FIG. 7(*b*)).

19. After repeating steps 120-126 on this more finely tuned grid size, the position and standard deviation from the second loop are then used as the initial solution for a finer X and Y position scan.

Figure 7C:
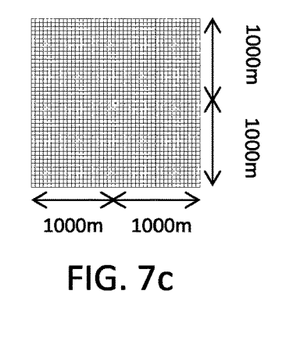

20. Next, steps 120-126 are repeated once again with a still smaller step size (i.e. step size of 0.1 m on a 41×41 grid as illustrated in FIG. 7(*c*)). It should be noted that the granularity with which the iterations are performed can vary from a single iteration (which would use a small step size but a very large grid in order to cover the necessary distance to capture the potential movement of nodes, to a higher number of grids with less variance in step sizes; however, in testing it has been found that this three loop iteration provides highly accurate results while utilizing the most efficient use of the computer's processing capabilities and not compromising accuracy of results.

Figure 6:
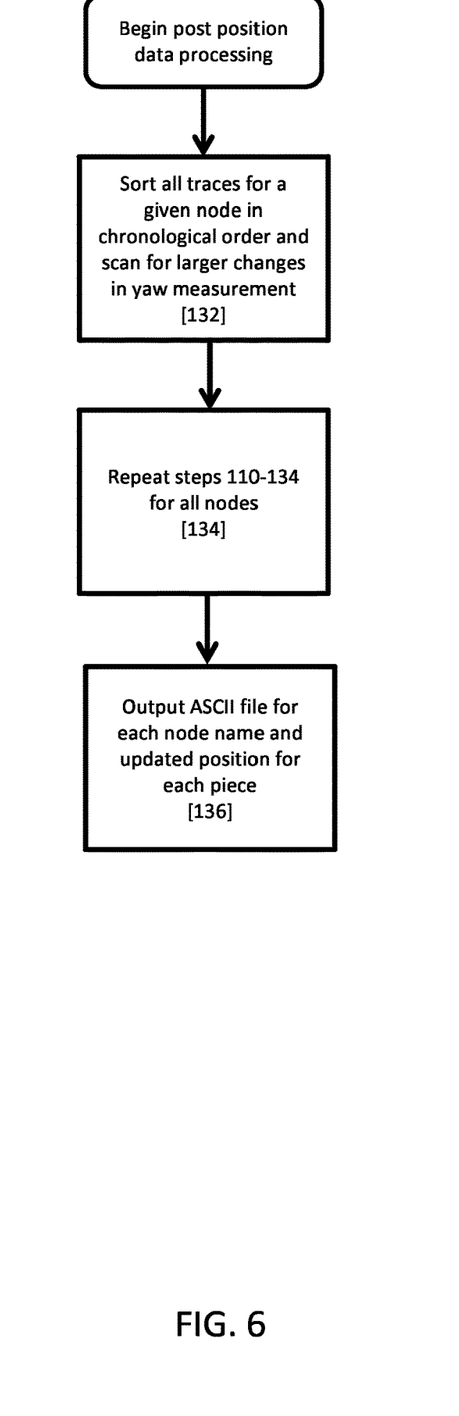
FIG. 6 is flow chart of the post-position data processing methodology in accordance with an aspect of the invention.

21. Upon completion of the estimation routine and sub-routine, post-position data processing can be done. In step 132, all traces for a given node are sorted into chronological order and scanned for larger changes in the yaw measurement (compass heading).

22. In step 134, it is determined whether there are occurrences of large yaw changes and the final computed best standard deviation is large (for example, when a node moves part of the way through the data collection), then split the node into time periods separated by large changes in yaw (such that each time period will be include only the time when a single position was occupied by that node), and if so, then the node is split into time periods separated by large changes in yaw. If the standard deviation of travel time error is small then the node is not split into multiple ensembles. It is worth noting that movement of a node is easiest to detect by looking at changes in yaw (this is a compass heading), but when nodes are moved their tilt (pitch and roll) are sometimes changed as well; however, the yaw is just the easiest one to see change, although any or all of the orientations can be used for this purpose.

23. Steps 110-134 are then repeated for all nodes. If a node was split into multiple pieces in step 134 then each piece is passed through the sequence separately.

24. Finally, in step 136, an ASCII file for each node name and updated position for each piece (if necessary) is output. Other output formats could also be used as would be apparent to one of ordinary skill in the art.

With the data processing complete and all node positions determined to an acceptably accurate degree, further use of this refined data can be made by preparing a seismic map or other useful expression of the data.

What is claimed is:

1. A computer implemented method for updating and refining model X, Y positions of an ocean bottom node for use in creating a seismic survey through the use of data that has been sensed and collected by the node, after emission of a plurality of shots each from a known shot location, the data comprising energy intensity and energy arrival time at the node for each shot, where each position along an ocean bottom can be defined using coordinates X and Y, and a coordinate Z defines a depth of each position, the method comprising the steps of:

a) obtaining the data from the node;
   b) performing a position estimation routine on the data to obtain a model X, Y position of the node, comprising computing a standard deviation of traveltime errors, the traveltime errors defined by differences between a plurality of first arrival times of the data and calculated traveltimes based on the model X, Y position and a measured Z position, the plurality of first arrival times defined by at least one direct arrival and at least one refracted arrival;
   c) performing a position estimation sub-routine on the data to determine a refined X,Y position of the node, comprising calculating an updated node position and comparing the computed standard deviation of traveltime errors with a computed, new standard deviation of traveltime errors for the updated node position of the node, and if the new standard deviation is lower, then assigning it as a best standard deviation and the updated position as a new position, but if the new standard deviation is greater than the previous the best standard deviation then not assigning a new position and standard deviation; and
   d) selecting the X,Y position of the node as the model node position corresponding to a lowest computed standard deviation.

2. The computer implemented method according to claim 1, further comprising a step of conditioning the data, the step of conditioning the data comprising:
   a. selecting an offset range of input traces of predetermined magnitude;
   b. picking a largest peak amplitude and a largest trough amplitude in a first predetermined period of data collected by the node after the time of an energy shot at a shot location;
   c. determining a difference between the largest peak and largest trough amplitudes to give a total excursion value;
   d. picking a first arrival time on each trace using a standard first break picking routine; and
   e. determining an initial position of the node.

3. The computer implemented method according to claim 2, wherein said step of performing a position estimation routine on the conditioned data comprises the steps of:
   a. using a predetermined transit velocity, determining model arrival times of the traces in the node using the initial node position and the shot locations and node depth;
   b. computing a traveltime error between the picked arrival times and the model arrival times;
   c. computing the standard deviation of the traveltime error of all traces within a first predetermined distance of the initial position;
   d. recomputing the standard deviation of traveltime error computed in step (c), and ignoring all errors greater than a predetermined number of standard deviations; and
   e. setting the recomputed standard deviation as the new best standard deviation.

4. The computer implemented method according to claim 3, wherein the first predetermined distance is 300 m.

5. The computer implemented method according to claim 3, wherein the predetermined number of standard deviations is two.

6. The computer implemented method according to claim 3, wherein said step of performing a position estimation sub-routine on the conditioned data to determine the refined position of the node, comprises the steps of:

a. changing a previous node position by a second predetermined distance within a predefined grid to obtain the updated node position;
b. computing traveltime for the updated node position to obtain an updated arrival time;
c. using the updated node position, computing the traveltime error between the picked arrival times and the updated arrival times;
d. computing an updated standard deviation of the traveltime error of all traces within the first predetermined distance of a model position;
e. recomputing the updated standard deviation of traveltime error computed in step (d), ignoring all errors greater than a predetermined number of standard deviations;
f. comparing the updated standard deviation computed in step (e) with the new best standard deviation, and if the updated standard deviation is lower, then assigning it as the new best standard deviation and the updated node position as the new best position; and
g. repeating steps (a)-(f) for all locations within the predefined grid.

7. The computer implemented method according to claim 6, wherein said step of performing a post-position processing of the data comprises the steps of:
a. sorting all traces for a given node into chronological order and scanning for changes in a yaw measurement above a predetermined yaw magnitude; and
b. splitting the traces into time periods separated by changes in yaw above said predetermined yaw magnitude if there are occurrences of yaw changes above the predetermined yaw magnitude and a final computed best standard deviation is above a predetermined threshold.

8. The computer implemented method according to claim 1, wherein each of the steps is performed for every node used in the survey.

9. The computer implemented method according to claim 1, wherein said step of performing a position estimation routine comprises the steps of:
a. using a predetermined transit velocity, determining model arrival times of the traces in the node using an initial node position and the shot locations and node depth;
b. computing a traveltime error between the picked arrival times and the model arrival times;
c. computing the standard deviation of the traveltime error of all traces within a first predetermined distance of the initial position; and
d. recomputing the standard deviation of traveltime error computed in step (c), and ignoring all errors greater than a predetermined number of standard deviations in magnitude.

10. The computer implemented method according to claim 9, wherein the first predetermined distance is 300 m.

11. The computer implemented method according to claim 9, wherein the predetermined number of standard deviations is two.

12. The computer implemented method according to claim 9, wherein said step of performing a position estimation sub-routine to determine a refined position of the node, comprises the steps of:
a. changing a previous node position by a second predetermined distance within a predefined grid to obtain an updated node position;
b. computing traveltime for the updated node position to obtain an updated arrival time;
c. using the updated node position, computing the traveltime error between picked arrival times and updated arrival times;
d. computing an updated standard deviation of the traveltime error of all traces within the first predetermined distance of the model position;
e. recomputing the updated standard deviation of traveltime error computed in step (d), ignoring all errors greater than a predetermined number of standard deviations;
f. comparing the updated standard deviation computed in step (e) with the new best standard deviation, and if the updated standard deviation is lower, then assigning it as the new best standard deviation and the current position as the new best position; and
g. repeating steps (a)-(f) for all locations within the predefined grid.

13. The computer implemented method according to claim 12, wherein said step of performing a post-position processing of the data comprises the steps of:
a. sorting all traces for a given node into chronological order and scanning for changes in yaw measurement above a predetermined yaw magnitude; and
b. splitting the traces into time periods separated by changes in yaw above said predetermined yaw magnitude if there are occurrences of yaw changes above the predetermined yaw magnitude and a final computed best standard deviation is above a predetermined threshold.

14. The computer implemented method according to claim 1, wherein step c) is repeated using first grid positions of a first grid, the first grid positions characterized by a first step size, with each first grid position being used to determine a refined X, Y position of the node.

15. The computer implemented method according to claim 14, wherein after step c) is performed using the first grid, step c) is performed using a second grid comprising second grid positions characterized by a second step size that is smaller than the step size of the first grid, with each second grid position being used to determine a refined X, Y position of the node.

16. The computer implemented method according to claim 1, further comprising a step e) generating a seismic map using the X, Y position of the node corresponding to a lowest computed standard deviation.

17. A non-transitory computer readable medium storing instructions for updating and refining a model X, Y position of an ocean bottom node that when executed cause a computer capable of processing data to perform the steps of:
a. performing a position estimation routine on the data to obtain a model X, Y position of the node comprising computing a standard deviation of traveltime errors, the traveltime errors defined by differences between a plurality of first arrival times of the data and calculated traveltimes based on the model X, Y position and a measured Z position, the plurality of first arrival times defined by at least one direct arrival and at least one refracted arrival;
b. performing a position estimation sub-routine on the data to determine a refined model X, Y position of the node, comprising calculating an updated node position and comparing the computed standard deviation of traveltime errors with a computed, new standard deviation of traveltime errors for the updated node position of the node, and if the new standard deviation is lower, then assigning it as a best standard deviation and the updated position as a new position of the node, but if the new standard deviation is greater than the previous best standard deviation then not assigning a new position and the best standard deviation to the node; and c. selecting the X,Y position of the node as the model node position corresponding to a lowest computed standard deviation.

18. The non-transitory computer readable medium according to claim 17, further comprising a step of conditioning the data, said step of conditioning the data, comprising:

a. producing an offset range of input traces of predetermined magnitude;

b. picking a largest peak amplitude and a largest trough amplitude in a first predetermined period of data collected by the node after the time of an energy shot at a shot location;

c. determining a difference between the largest peak and largest trough amplitudes to give a total excursion value;

d. picking a first arrival time on each trace using a standard first break picking routine; and e. determining an initial position of the node.

19. The non-transitory computer readable medium according to claim 18, wherein said step of performing a position estimation routine on the conditioned data comprises:

a. using a predetermined transit velocity, determining a model arrival times of the traces in the node using the initial node position and the shot locations and node depth;

b. computing a traveltime error between the picked arrival times and the model arrival times;

c. computing the standard deviation of the traveltime error of all traces within a first predetermined distance of the initial position;

d. recomputing the standard deviation of traveltime error computed in step (c), and ignoring all errors greater than a predetermined number of standard deviations; and e. setting the recomputed standard deviation as the new best standard deviation.

20. The non-transitory computer readable medium according to claim 19, wherein the first predetermined distance is 300 m.

21. The non-transitory computer readable medium according to claim 19, wherein the predetermined number of standard deviations is two.

22. The non-transitory computer readable medium according to claim 19, wherein said step of performing a position estimation sub-routine on the conditioned data to determine the refined position of the node, comprises:

a. changing a previous node position by a second predetermined distance within a predefined grid to obtain the updated node position;

b. computing traveltime for the updated node position to obtain an updated arrival time;

c. using the updated node position, computing the traveltime error between the picked arrival times and the updated arrival times;

d. computing an updated standard deviation of the traveltime error of all traces within the first predetermined distance of a model position;

e. recomputing the updated standard deviation of traveltime error computed in step (d), ignoring all errors greater than a predetermined number of standard deviations;

f. comparing the updated standard deviation computed in step (e) with the new best standard deviation, and if the updated standard deviation is lower, then assigning it as the new best standard deviation and the updated node position as the new best position; and g. repeating steps (a)-(f) for all locations within the predefined grid.

23. The non-transitory computer readable medium according to claim 22, wherein said step of performing a post-position processing of the data comprises:

a. sorting all traces for a given node into chronological order and scanning for changes in a yaw measurement above a predetermined yaw magnitude; and b. splitting the traces into time periods separated by changes in yaw above said predetermined yaw magnitude if there are occurrences of yaw changes above the predetermined yaw magnitude and a final computed best standard deviation is above a predetermined threshold.

24. The non-transitory computer readable medium according to claim 17, wherein said step of performing a position estimation routine comprises:

a. using a predetermined transit velocity for purposes of determining model arrival times of the traces in the node using an initial node position and the shot locations and node depth;

b. computing a traveltime error between the picked arrival times and the model arrival times;

c. computing the standard deviation of the traveltime error of all traces within a first predetermined distance of the initial position; and d. recomputing the standard deviation of traveltime error computed in element (c), and ignoring all errors greater than a predetermined number of standard deviations in magnitude.

25. The non-transitory computer readable medium according to claim 24, wherein the first predetermined distance is 300 m.

26. The non-transitory computer readable medium according to claim 24, wherein the predetermined number of standard deviations is two.

27. The non-transitory computer readable medium according to claim 24, wherein said step of performing a position estimation sub-routine to determine a refined position of the node, comprises:

a. changing a previous node position by a second predetermined distance within a predefined grid to obtain an updated node position;

b. computing traveltime for the updated node position to obtain an updated arrival time;

c. using the updated node position, computing the traveltime error between the picked arrival times and updated arrival times;

d. computing an updated standard deviation of the traveltime error of all traces within the first predetermined distance of the model position;

e. recomputing the updated standard deviation of traveltime error computed in step (d), ignoring all errors greater than a predetermined number of standard deviations;

f. comparing the updated standard deviation computed in step (e) with the new best standard deviation, and if the updated standard deviation is lower, then assigning it as the new best standard deviation and the current position as the new best position; and g. repeating steps (a)-(f) for all locations within the predefined grid.

28. The non-transitory computer readable medium according to claim 27, wherein said step of performing a post-position processing of the data comprises:
   a. sorting all traces for a given node into chronological order and scanning for changes in yaw measurement above a predetermined yaw magnitude; and
   b. splitting the traces into time periods separated by changes in yaw above said predetermined yaw magnitude if there are occurrences of yaw changes above the predetermined yaw magnitude and a final computed best standard deviation is above a predetermined threshold.

29. A computer system comprising a data processor running data processing software on a computer and configured to receive data downloaded from a seismic node, wherein the data processing software is capable of determining X, Y position of the node, where each position along an ocean bottom can be defined using coordinates X and Y, the computer system further configured to perform the steps of:
   a. performing a position estimation routine on the data to obtain a model X, Y position of the node, comprising computing a standard deviation of traveltime errors, the traveltime errors defined by differences between a plurality of first arrival times of the data and calculated traveltimes based on the model X, Y position and a measured Z position, the plurality of first arrival times defined by at least one direct arrival and at least one refracted arrival;
   b. performing a position estimation sub-routine on the data to determine a refined X, Y position of the node, comprising calculating an updated node position and comparing the computed standard deviation of traveltime errors with a computed, new standard deviation of traveltime errors for the updated node position of the node, and if the new standard deviation is lower, then assigning it as a best standard deviation and the updated position as a new position, but if the new standard deviation is greater than a previous best standard deviation then not assigning a new position and best standard deviation; and
   c. selecting the X,Y position of the node as the model node position corresponding to a lowest computed standard deviation.

30. The computer system according to claim 29, further comprising a step of conditioning the data, the step of conditioning the data comprising:
   a. producing an offset range of input traces of predetermined magnitude;
   b. picking a largest peak amplitude and a largest trough amplitude in a first predetermined period of data collected by the node after the time of the energy shot;
   c. determining the difference between a largest peak and largest trough amplitudes to give a total excursion value;
   d. picking a first arrival time on each trace using a standard first break picking routine; and
   e. determining an initial position of the node.

31. The computer system according to claim 30, wherein said step of performing a position estimation routine on the conditioned data comprises:
   a. using a predetermined transit velocity, determining a model arrival times of the traces in the node using the initial node position and the shot locations and node depth;
   b. computing a traveltime error between the picked arrival times and the model arrival times;
   c. computing the standard deviation of the traveltime error of all traces within a first predetermined distance of the initial position;
   d. recomputing the standard deviation of traveltime error computed in step (c), and ignoring all errors greater than a predetermined number of standard deviations; and
   e. setting the recomputed standard deviation as the new best standard deviation.

32. The computer system according to claim 31, wherein the first predetermined distance is 300 m.

33. The computer system according to claim 31, wherein the predetermined number of standard deviations is two.

34. The computer system according to claim 31, wherein said step of performing a position estimation sub-routine on the conditioned data to determine the refined position of the node, comprises:
   a. changing a previous node position by a second predetermined distance within a predefined grid to obtain the updated node position;
   b. computing traveltime for the updated node position to obtain an updated arrival time;
   c. using the updated node position, computing the traveltime error between the picked arrival times and the updated arrival times;
   d. computing a updated standard deviation of the traveltime error of all traces within the first predetermined distance of a model position;
   e. recomputing the updated standard deviation of traveltime error computed in step (d), ignoring all errors greater than a predetermined number of standard deviations;
   f. comparing the updated standard deviation computed in step (e) with the new best standard deviation, and if the updated standard deviation is lower, then assigning it as the new best standard deviation and the updated node position as the new best position; and
   g. repeating steps (a)-(f) for all locations within the predefined grid.

35. The computer system according to claim 34, wherein said step of performing a post-position processing of the data comprises:
   a. sorting all traces for a given node into chronological order and scanning for changes in a yaw measurement above a predetermined yaw magnitude; and
   b. splitting the traces into time periods separated by changes in yaw above said predetermined yaw magnitude if there are occurrences of yaw changes above the predetermined yaw magnitude and a final computed best standard deviation is above a predetermined threshold.

36. The computer system according to claim 29, wherein said step of performing a position estimation routine comprises:
   a. using a predetermined transit velocity for purposes of determining model arrival times of the traces in the node using an initial node position and the shot locations and node depth;
   b. computing a traveltime error between the picked arrival times and the model arrival times;
   c. computing the standard deviation of the traveltime error of all traces within a first predetermined distance of the initial position; and
   c. recomputing the standard deviation of traveltime error computed in element (c), and ignoring all errors greater than a predetermined number of standard deviations in magnitude.

37. The computer system according to claim 36, wherein the first predetermined distance is 300 m.

38. The computer system according to claim 36, wherein the predetermined number of standard deviations is two.

39. The computer system according to claim 36, wherein said step of performing a position estimation sub-routine to determine a refined position of the node, comprises:
   a. changing a previous node position by a second predetermined distance within a predefined grid to obtain an updated node position;
   b. computing traveltime for the updated node position to obtain an updated arrival time;
   c. using the updated node position, computing the traveltime error between the picked arrival times and updated arrival times;
   d. computing an updated standard deviation of the traveltime error of all traces within the first predetermined distance of the model position;
   e. recomputing the updated standard deviation of traveltime error computed in step (d), ignoring all errors greater than a predetermined number of standard deviations;
   f. comparing the updated standard deviation computed in step (e) with the new best standard deviation, and if the updated standard deviation is lower, then assigning it as the new best standard deviation and the current position as the new best position; and
   g. repeating steps (a)-(f) for all locations within the predefined grid.

40. The computer system according to claim 39, wherein said step of performing a post-position processing of the data comprises:
   a. sorting all traces for a given node into chronological order and scanning for changes in yaw measurement above a predetermined yaw magnitude; and
   b. splitting the traces into time periods separated by changes in yaw above said predetermined yaw magnitude if there are occurrences of yaw changes above the predetermined yaw magnitude and a final computed best standard deviation is above a predetermined threshold.

* * * * *